May 30, 1939.  W. J. ROBERTSON  2,160,085
GLASS EDGING MACHINE
Filed April 10, 1936  3 Sheets-Sheet 1
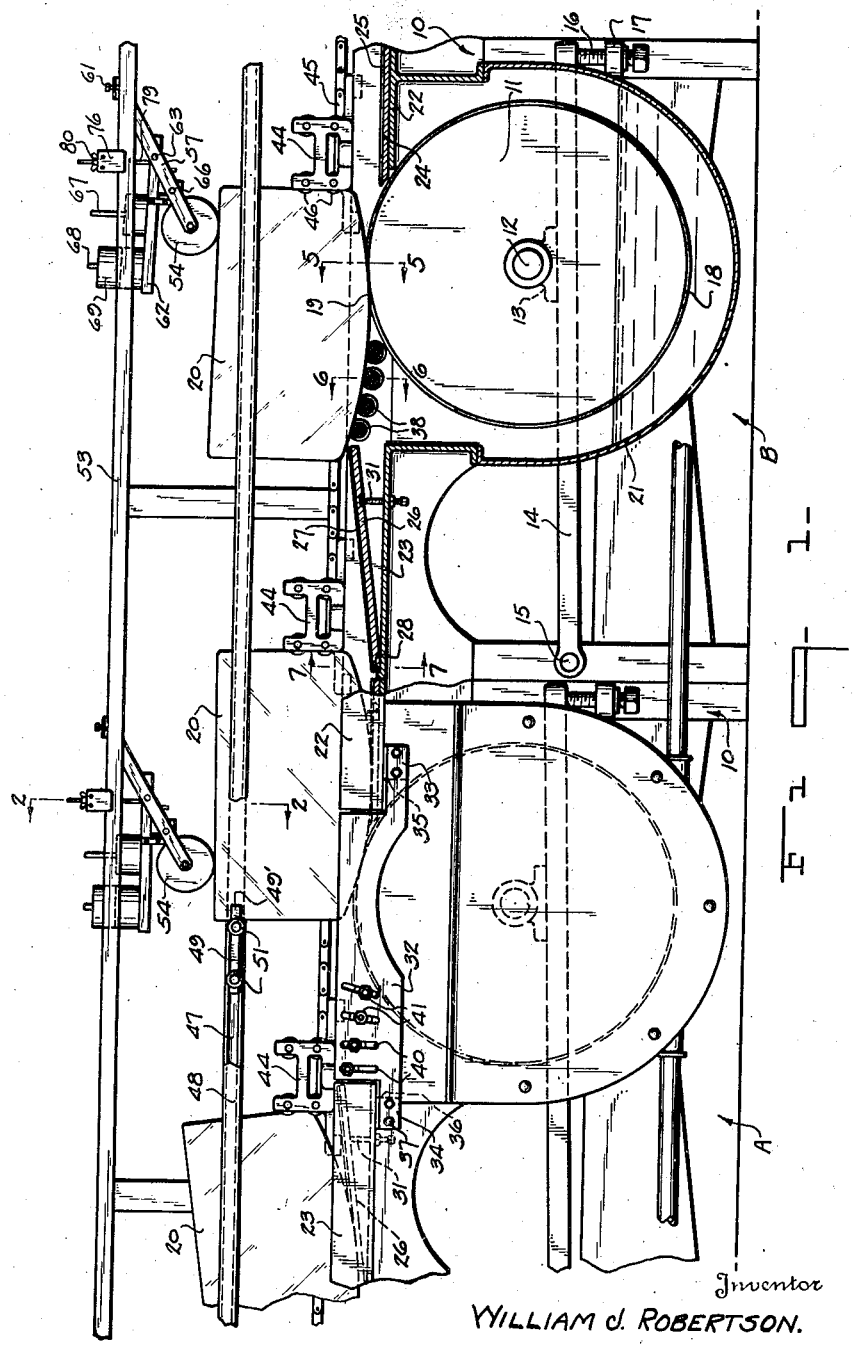
Inventor
WILLIAM J. ROBERTSON.
By Frank Fraser
Attorney May 30, 1939. W. J. ROBERTSON 2,160,085
GLASS EDGING MACHINE
Filed April 10, 1936   3 Sheets-Sheet 2
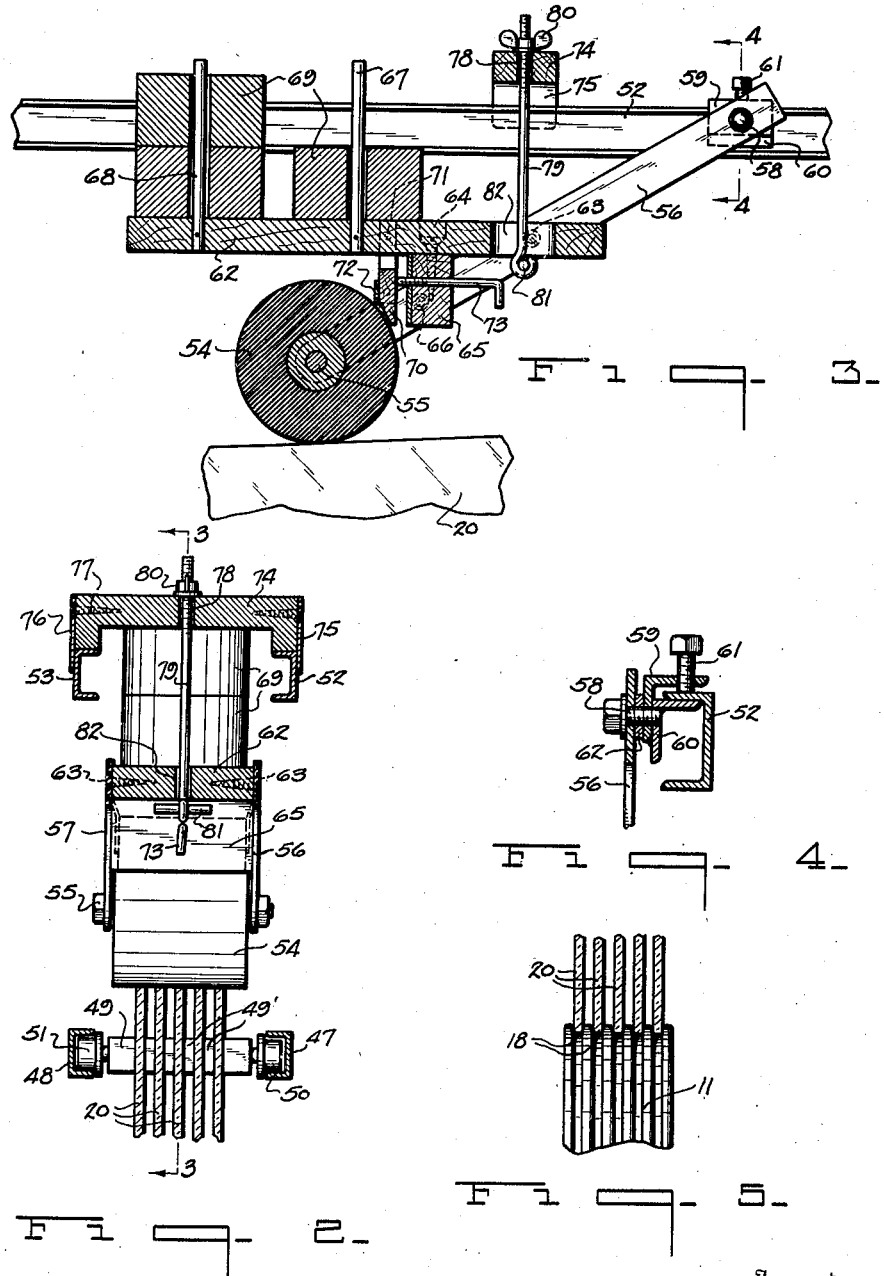
Inventor
WILLIAM J. ROBERTSON.
By Frank Fraser
Attorney

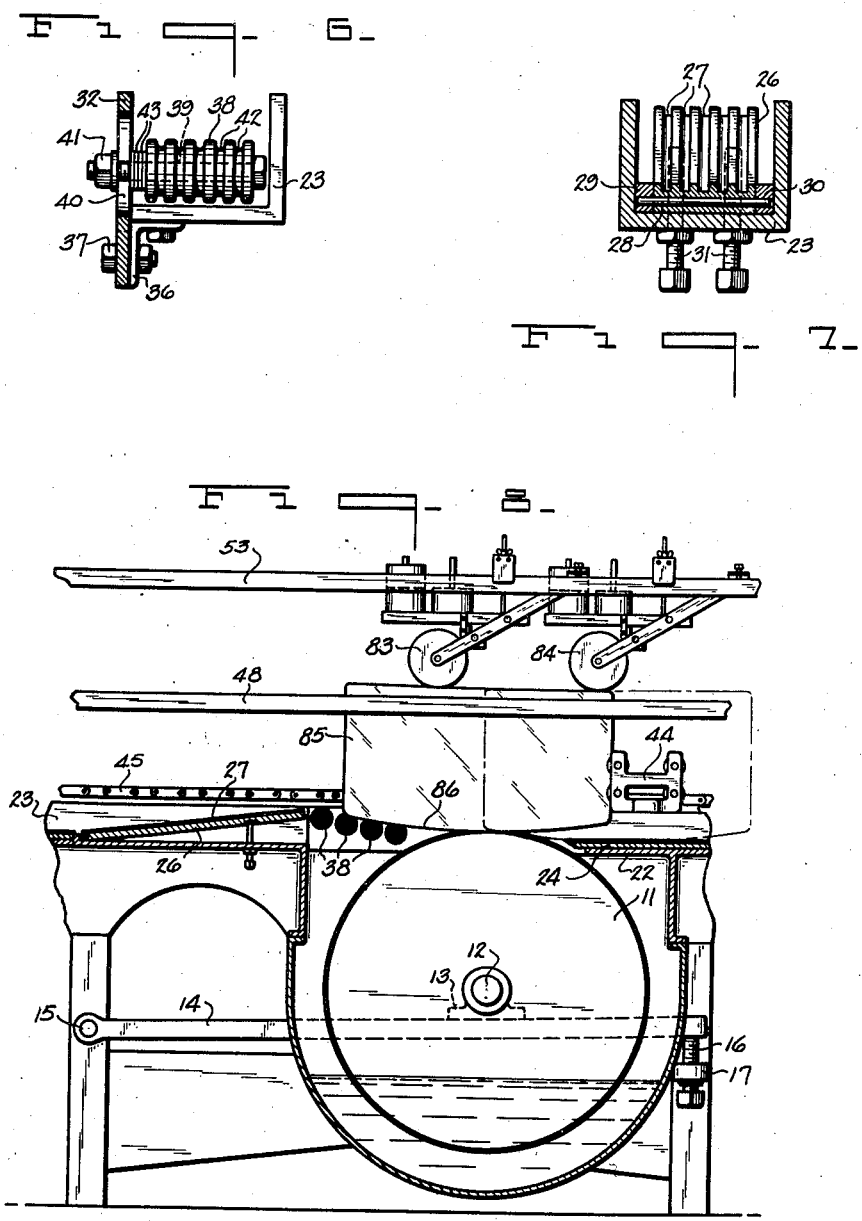

Patented May 30, 1939

2,160,085

UNITED STATES PATENT OFFICE 2,160,085

GLASS EDGING MACHINE

William J. Robertson, Toledo, Ohio, assignor to Libbey-Owens-Ford Glass Company, Toledo, Ohio, a corporation of Ohio Application April 10, 1936, Serial No. 73,632

11 Claims. (Cl. 51—74)

The present invention relates to glass grinding machines in general and more particularly to the Weber type of machine which is used for edging glass sheets or plates.

Glass sheets employed in automobile work generally require a rounded or "pencil" edge and in the Weber type of machine this work is accomplished by carrying the sheets either singly or in sets made up of several sheets arranged side by side over a series of vertical grinding and polishing wheels whose edges are grooved to the curvature required on the edges of the sheets. The Weber edging machine is designed primarily for grinding glass sheets having straight edges and during grinding it is customary to provide means engaging the upper edges of said sheets for maintaining the bottom edges thereof in engagement with the grinding wheels.

This invention involves an improvement upon the Weber machine whereby the said machine may be used for edging not only sheets of glass having straight edges but also curved edges of different contours and particularly relatively long or sweeping edges of gradual curvature.

An important object of the invention is the provision, in a machine of this type, of a novel form of runway for supporting the glass sheets and for causing them to move in the desired path according to the particular edge contour being ground, said runway being adjustable to take care of sheets of different curvatures.

Another object of the invention is the provision, in a machine of this type, of novel pressure means mounted above each grinding wheel and engaging the upper edges of the glass sheets for maintaining the bottom edges thereof in proper engagement with said wheel, said pressure means being adjustable horizontally with respect to the grinding wheel depending upon the shape and size of glass sheet being edged.

A further object of the invention is the provision of a machine of this type embodying various novel features of construction, combination and arrangement which cooperate to provide a machine ideally suited for the purposes for which it is designed and which requires no attention or manipulation on the part of the operators other than the placing of the sheets to be ground within the machine and their subsequent removal therefrom after grinding.

Other objects and advantages of the invention will become more apparent during the course of the following description when taken in connection with the accompanying drawings.

In the drawings wherein like numerals are employed to designate like parts throughout the same, Fig. 1 is a side elevation, partially in section, of a sheet glass edging machine constructed in accordance with the invention;

Fig. 2 is a vertical sectional view of the pressure means taken substantially on line 2—2 of Fig. 1;

Fig. 3 is a vertical sectional view taken substantially on line 3—3 of Fig. 2;

Fig. 4 is a detail sectional view taken substantially on line 4—4 of Fig. 3;

Fig. 5 is a vertical sectional view taken substantially on line 5—5 of Fig. 1;

Fig. 6 is a vertical sectional view through the roller runway section taken substantially on line 6—6 of Fig. 1;

Fig. 7 is a vertical sectional view through the inclined runway section taken substantially on line 7—7 of Fig. 1; and Fig. 8 is a side elevation of the machine, partially in section, showing a modified form of pressure means engaging the upper edges of the glass sheets.

In its preferred embodiment, the edging machine herein provided is constructed of a plurality of unit sections A, B, etc., removably secured together end to end so that any desired number of sections may be used, depending upon the number of grinding and/or polishing elements or wheels the work requires. Each unit section comprises a supporting framework 10 upon which is mounted a vertical grinding wheel 11, said wheel being fixed upon a horizontal axle 12 which is suitably driven. The axle may be journaled at opposite ends in bearings 13 carried by a subframe 14 pivoted at one end as at 15 to the supporting framework 10 and freely supported at its opposite end upon an adjusting screw 16 threaded vertically through a boss 17 also secured to the framework 10. With this arrangement, it will be seen that upon proper rotation of the screw 16, the grinding wheel 11 can be adjusted vertically as desired to suit different requirements. Each grinding wheel is provided with one or a plurality of peripheral grooves 18 of the curvature necessary to round the curved bottom edges 19 of the glass sheets 20 as the said sheets are carried over said wheel. The grinding wheel 11 rotates in a suitable trough or receptacle 21 carrying water or a mixture of abrasive and water as is generally known in the art.

Arranged at opposite sides of each grinding wheel 11 are the horizontally aligned channel members 22 and 23, the bottoms of which are located below the top of the said grinding wheel. Positioned within the channel member 22 and supported on the bottom thereof is a horizontal runway section 24 longitudinally grooved as at 25 and which grooves are in alignment with the grooves in the grinding wheel 11. Arranged within the channel member 23 is a flat inclined runway section 26 also provided with a plurality of longitudinal grooves 27 which register with the grooves in the grinding wheel 11 and also with the grooves 25 in runway section 24. The inclined runway section 26 is pivotally mounted at the end thereof, remote from the grinding wheel of the respective unit section, upon a pin 28, said pin passing transversely through the runway and being received at its opposite ends in bearing blocks 29 and 30 disposed at opposite sides of the channel member 23 (Fig. 7). In order to vary the angle of inclination of the runway section 26, there is provided a pair of adjusting screws 31 passing upwardly through the bottom of the channel member 23 and engaging the bottom of the said runway.

The two channel members 22 and 23 are horizontally spaced from one another and the upper portion of the surfacing wheel 11 projects upwardly within the opening formed therebetween. Extending between and secured to the channel members 22 and 23 at the front of the machine is a vertically disposed plate 32, said plate being provided at its opposite ends with reduced extensions 33 and 34 which are secured to angle brackets 35 and 36 respectively by bolts or the like 37, said angle brackets being carried by the channel members 22 and 23. Carried by the plate 32 between the grinding wheel 11 and the inclined runway section 26 is a roller runway section made up of a plurality of transverse rollers 38 mounted on pins 39 (Fig. 6) extending through substantially vertical slots 40 in the plate 32 and which may be clamped in any desired position longitudinally of the slots by nuts 41 so that the runway section may be adjusted to meet different requirements.

As shown in Fig. 1, the rollers 38 are arranged to form a runway which inclines upwardly from the grinding wheel 11 to the inclined stationary runway 26. The rollers 38 are provided with a plurality of grooves 42 which align with the grooves 18 in the grinding wheel and also with the grooves 27 in runway section 26. The rollers 38 can be adjusted transversely of the machine by increasing or decreasing the number of shims 43 so as to bring the grooves in the said rollers into registry with the grooves in the grinding wheel.

The glass sheets 20 are moved along over the runways and grinding wheels by means of pusher devices 44 having suitable connection with an endless drag chain 45 extending longitudinally of the machine and driven by suitable means which are not shown. The upper edges of the vertical side portions of the channel members 22 and 23 and also the upper edge of the plate 32 constitute guide rails along which the said pusher devices are slidable. Carried by the pusher member 44 is a pair of superimposed pusher rollers 46 having grooves within which the rear vertical edges of the glass sheets are adapted to fit so that the pusher device serves to advance the glass sheets to the left in Fig. 1 when the drag chain 45 is set in motion.

Mounted above the drag chain 45 are the longitudinally extending, spaced parallel channel rails 47 and 48 which carry the guide member 49, said guide member being substantially rectangular in plan and carrying at opposite sides thereof rollers 50 and 51 which roll along in the channel rails 47 and 48, as best shown in Fig. 2. The guide member is provided with a plurality of spaced fingers 49' which are received between the forward edges of the glass sheets so that the said guide member serves to guide the said sheets and maintain them properly spaced from one another.

In the operation of the machine above described, the grinding wheel 11, inclined runway section 26, and rollers 38 are first adjusted vertically relative to one another and to the horizontal runway section 24, depending upon the shape and size of the glass sheets to be ground. The glass sheets are mounted in a vertical position upon the horizontal runway section 24 of the first grinding unit at the forward end of the machine and the said sheets standing on edge, with their edges to be ground facing downwardly, are then moved continuously forwardly through the machine by the pusher devices 44 and maintained in properly spaced relation relative to one another by the guide member 49. The glass sheets are partially supported on edge upon the grinding wheels 11 while being ground, while the runways cooperate with the said wheels to guidingly support the sheets during grinding. The glass sheets approach each grinding wheel by movement along the horizontal runway section 24 and, after passing over the grinding wheel, are received upon the take-off runway section composed of the rollers 38, from which they pass onto the inclined runway section 26 down which the sheets slide onto the approach runway section 24 of the next grinding unit. With the particular machine herein disclosed, five sheets of glass of similar shape and size are arranged side by side and movable as a group over the grinding wheels.

It will be seen in Fig. 1 that the bottom edges 19 of the glass sheets 20 to be ground are relatively long and of gradual or sweeping curvature. While the form of machine herein provided is particularly adapted to the grinding of this type of edge contour, it is of course not restricted thereto. To take care of the particular curvature shown, however, the approach runway section 24 is positioned below the top of the grinding wheel, while the roller runway section positioned at the opposite side of the wheel inclines upwardly away therefrom, with the curvature of the roller runway section being substantially the same as the curvature of the sheet edges 19 to be ground. The uppermost roll 38 is disposed substantially on a horizontal level with the upper end of the inclined runway section 26. The glass sheets are therefore caused to move in the desired path according to the particular edge contour being ground. The runway is not only adjustable to take care of sheets of different curvatures but, in addition, the machine can be employed for grinding straight edges by simply lowering the inclined runway section 26 into horizontal position and by adjusting the rollers 38 so that they are in horizontal alignment with the runways 24 and 26. When this is done, the grinding wheel 11 should of course also be lowered.

In order to force the glass sheets downwardly during grinding so as to give them the necessary grinding pressure upon the grinding wheels, there is herein provided novel means for exerting the desired downward pressure upon the sheets as they are moved over the wheels. The pressure means is carried by a pair of longitudinally extending parallel channel beams 52 and 53 disposed on edge above the channel rails 47 and 48 and consists of a rotatable roller 54 preferably, though not necessarily, of rubber. The roller 54 is mounted upon a transverse pin 55 rotatably supported at the lower ends of the inclined arms 56 and 57 which are pivotally fastened at their upper ends to the channel beams 52 and 53 respectively. More specifically, each arm 56 and 57 is pivotally mounted at its upper end upon a machine screw 58 which is threaded transversely through the vertical portions of the two angle pieces 59 and 60, the horizontal portions of which are positioned respectively above and beneath the upper horizontal flange of the channel beam 52 and are clamped thereto by a screw 61. A washer 62 is preferably mounted upon the pivot pin 58 between the arm 56 and angle piece 59.

Arranged between the arms 56 and 57, intermediate their ends, is a substantially horizontal platform 62 secured to the said arms by screws 63. Carried upon the underside of the platform 62 and secured thereto by screw 64 is a depending block 65 also received between and secured to the arms 56 and 57 by screws 66. In this way the platform 62 is rigidly secured to the arms 56 and 57. Carried by the platform 62 are the spaced vertical pins 67 and 68 carrying weights 69 which force the roller 54 downwardly to exert the desired pressure upon the upper edges of the glass sheets. The pressure may be varied by increasing or decreasing the weights 69.

While in some cases it may be desirable to permit free rotation of the pressure roller 54, yet it has been found that with some sizes and shapes of glass sheets, it is more advantageous if a braking or retarding action is applied to the roller in a manner to prevent free rotation thereof and that if this is done much more satisfactory edging results are obtained than where the roller is allowed to freely rotate. In other words, by preventing free rotation of the pressure roller so as to provide greater friction between the roller and glass sheets, the said sheets are held much steadier and are maintained in a truer condition during grinding. This is herein accomplished by the provision of a brake shoe 70 depending from the platform 62 and pivoted thereto at its upper end as at 71. Carried by the brake shoe is a brake band 72 adapted to engage the periphery of the roller 54 and the pressure of the brake band against the roller can be regulated by a hand rod 73 carried by the brake shoe and threaded through the block 65.

In order to limit the downward movement of the pressure roller 54, there is slidably supported upon the channel beams 52 and 53 a transversely arranged strip 74 to the opposite side of which are secured the vertical metal plates 75 and 76 by screws 77, said plates engaging the outer faces of the channel beams and preventing lateral displacement of the strip 74. Extending loosely through a vertical opening 78 in the strip 74 is a rod 79 having a wing nut 80 threaded upon the upper end thereof and a transverse pin 81 carried at its lower end. The rod 79 also extends through an opening 82 in the platform 62 and the transverse pin 81 is normally positioned slightly beneath the platform, as shown in Fig. 2, so that the pressure of the roller 54 upon the glass sheets is determined by the weights 69. However, the transverse pin 81 at the lower end of rod 79 limits the downward movement of the roller 54 when it is not in engagement with the glass sheets.

While it may have been heretofore proposed to make use of a rotatable pressure roller engaging the upper edges of the glass sheets in the Weber typing machine, yet in all such cases the roller has been mounted in a relatively fixed position in that it is not movable bodily horizontally with respect to the grinding wheel according to the shape and size of glass sheet being ground. In accordance with this invention, the pressure roller 54 is adjustable bodily horizontally with respect to the grinding wheel to meet different requirements and renders the machine much more flexible and efficient. Thus, it has been found that the pressure roller acts more efficiently in different positions, depending upon the shape and size of sheet to be treated. For instance, when treating a glass sheet of one shape and size, it may be found desirable that the pressure roller be located in vertical alignment with the axis of rotation of the grinding wheel, while in treating sheets of other shapes and sizes, the roller acts more efficiently if positioned to one side or the other of the axis of rotation of the grinding wheel. By mounting the roller in the manner herein disclosed, it can be moved bodily horizontally to the position best suited to the particular shape and size of sheet being ground. There is also a definite relation between the pressure roller and the grinding wheel and sheet supporting runway. In other words, in determining and adjusting the vertical position of the grinding wheel, together with the curvature of the roller runway section and the angle of the inclined runway section, to effect the grinding of a particular shape and size of sheet, the pressure roller 54 will be located in one position, whereas when changing the grinding wheel, roller runway section, and inclined runway section to take care of a glass sheet of a different shape and size, the horizontal position of the pressure roller will be changed accordingly.

The form of invention illustrated in Fig. 8 is substantially the same in all respects as that described hereinabove with the exception that instead of using a single pressure roller, two horizontally disposed rollers 83 and 84 are employed. These rollers are positioned at opposite sides of the axis of rotation of the grinding wheel 11 and are adapted to engage the upper edges of the glass sheets 85 to maintain the bottom curved edges 86 thereof to be ground in engagement with the grinding wheel. The use of two pressure rollers arranged in this manner is found desirable under certain conditions and with glass sheets of certain shapes and sizes. Each pressure roller 83 and 84 is pivotally mounted in the same manner as pressure roller 54 so that the two rollers 83 and 84 are not only movable freely vertically independently of one another, but may also be adjusted bodily horizontally relative to one another and with respect to the axis of rotation of the grinding wheel.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The combination with a driven grinding wheel having a groove in its periphery and mounted for rotation about a horizontal axis, of a runway leading to and from the wheel and adapted to support a sheet to be ground on edge, means for moving said sheet over the runway and grinding wheel, pressure means engaging the upper edge of the sheet for maintaining the lower edge thereof in engagement with the grinding wheel including a rotatable roller, means for mounting said roller for free vertical movement, and means for limiting the downward movement of the roller, said roller being adjustable bodily horizontally with respect to said grinding wheel.

2. The combination with a driven grinding wheel having a groove in its periphery and mounted for rotation about a horizontal axis, of a runway leading to and from the wheel and adapted to support a sheet to be ground on edge, means for moving said sheet over the runway and grinding wheel, pressure means engaging the upper edge of the sheet for maintaining the lower edge thereof in engagement with the grinding wheel including a rotatable roller, means for mounting raid roller for free vertical movement, means for limiting the downward movement of the roller, and means for varying the pressure of the roller upon the upper edge of the sheet, said roller being adjustable bodily horizontally with respect to said grinding wheel.

3. The combination with a driven grinding wheel having a groove in its periphery and mounted for rotation about a horizontal axis, of a runway leading to and from the wheel and adapted to support a sheet to be ground on edge, means for moving said sheet over the runway and grinding wheel, pressure means engaging the upper edge of the sheet for maintaining the lower edge thereof in engagement with the grinding wheel including a rotatable roller, means for pivotally mounting said roller, means for urging the roller downwardly into engagement with the upper edge of the sheet, and means for limiting the downward movement thereof, said roller being adjustable bodily horizontally with respect to the grinding wheel.

4. The combination with a driven grinding wheel having a groove in its periphery and mounted for rotation about a horizontal axis, of a runway leading to and from the wheel and adapted to support a sheet to be ground on edge, means for moving said sheet over the runway and grinding wheel, and pressure means engaging the upper edge of the sheet for maintaining the lower edge thereof in engagement with the grinding wheel including a pair of members arranged at opposite sides of the axis of rotation of the grinding wheel, said pressure members being adjustable bodily horizontally relative to one another and with respect to the axis of rotation of said wheel.

5. The combination with a driven grinding wheel having a groove in its periphery and mounted for rotation about a horizontal axis, of a runway leading to and from the wheel and adapted to support a sheet to be ground on edge, means for moving said sheet over the runway and grinding wheel, pressure means engaging the upper edge of the sheet for maintaining the lower edge thereof in engagement with the grinding wheel including a pair of rotatable rollers arranged at opposite sides of the axis of rotation of the grinding wheel, and a separate mounting for each roller so that they are movable freely vertically independently of one another, said rollers being adjustable bodily horizontally relative to one another and with respect to the axis of rotation of said wheel.

6. In a sheet edging machine, the combination with a driven surfacing wheel having a groove in its periphery and mounted for rotation about a horizontal axis, a runway cooperating with the grinding wheel for guidingly supporting the sheet on edge during surfacing thereof including a substantially horizontal stationary section positioned at one side of the surfacing wheel below the top thereof, a roller section positioned at the opposite side of said wheel and inclining upwardly away therefrom, an inclined stationary section for receiving the sheet from the roller section and slanting downwardly therefrom, pressure means engaging the upper edge of the sheet for maintaining the lower edge thereof in engagement with the grinding wheel, said pressure means being adjustable bodily horizontally with respect to said wheel, and means for maintaining the said pressure means in adjusted position.

7. In a sheet edging machine, the combination with a driven surfacing wheel having a groove in its periphery and mounted for rotation about a horizontal axis, a runway cooperating with the grinding wheel for guidingly supporting the sheet on edge during surfacing thereof including a substantially horizontal stationary section positioned at one side of the surfacing wheel below the top thereof and leading thereto, a roller section leading from said wheel and inclining upwardly away therefrom, a pivotally mounted inclined stationary section for receiving the sheet from the roller section and slanting downwardly therefrom, means for adjusting the angle of inclination of said pivotally mounted runway section, pressure means engaging the upper edge of the sheet for maintaining the lower edge thereof in engagement with the grinding wheel, said pressure means being adjustable bodily horizontally with resect to said wheel, and means for maintaining the said pressure means in adjusted position.

8. In a sheet edging machine, the combination with a driven surfacing wheel having a groove in its periphery and mounted for rotation about a horizontal axis, a runway cooperating with the grinding wheel for guidingly supporting the sheet on edge during surfacing thereof including a substantially horizontal stationary section positioned at one side of the surfacing wheel below the top thereof, a roller section positioned at the opposite side of said wheel and including a plurality of rollers inclining upwardly away therefrom, means for adjusting said rollers vertically independently of one another to vary the curvature of the roller runway section, an inclined stationary section for receiving the sheet from the roller section and slanting downwardly therefrom, pressure means engaging the upper edge of the sheet for maintaining the lower edge thereof in engagement with the grinding wheel including a rotatable roller, means for pivotally mounting said roller, the roller being adjustable bodily horizontally with respect to said grinding wheel, and means for maintaining said roller in adjusted position.

9. In a sheet edging machine, the combination with a driven surfacing wheel having a groove in its periphery and mounted for rotation about a horizontal axis, a runway cooperating with the grinding wheel for guidingly supporting the sheet on edge during surfacing thereof including a substantially horizontal stationary section positioned at one side of the surfacing wheel below the top thereof and leading thereto, a roller section leading from said wheel and including a plurality of rollers inclining upwardly away therefrom, means for adjusting said rollers vertically independently of one another to vary the curvature of the roller runway section, a pivotally mounted inclined stationary section for receiving the sheet from said roller section and slanting downwardly therefrom, means for adjusting the angle of inclination of said pivotally mounted runway section, pressure means engaging the upper edge of the sheet for maintaining the lower edge thereof in engagement with the grinding wheel including a rotatable roller, means for pivotally mounting said roller, the roller being adjustable bodily horizontally with respect to said grinding wheel, and means for maintaining said roller in adjusted position.

10. In a sheet edging machine, the combination with a driven surfacing wheel having a groove in its periphery and mounted for rotation about a horizontal axis, a runway cooperating with the grinding wheel for guidingly supporting the sheet on edge during surfacing thereof including a substantially horizontal stationary section positioned at one side of the surfacing wheel below the top thereof, a roller section positioned at the opposite side of said wheel and inclining upwardly away therefrom, an inclined stationary section for receiving the sheet from the roller section and slanting downwardly therefrom, and pressure means engaging the upper edge of the sheet for maintaining the lower edge thereof in engagement with the grinding wheel including a pair of members arranged at opposite sides of the axis of rotation of the grinding wheel, said pressure members being adjustable bodily horizontally relative to one another and with respect to the axis of rotation of said wheel.

11. In a sheet edging machine, the combination with a driven surfacing wheel having a groove in its periphery and mounted for rotation about a horizontal axis, a runway cooperating with the grinding wheel for guidingly supporting the sheet on edge during surfacing thereof including a substantially horizontal stationary section positioned at one side of the surfacing wheel below the top thereof and leading thereto, a roller section leading from said wheel and including a plurality of rollers inclining upwardly away therefrom, means for adjusting said rollers vertically independently of one another to vary the curvature of the roller runway section, a pivotally mounted inclined stationary section for receiving the sheet from said roller section and slanting downwardly therefrom, means for adjusting the angle of inclination of said pivotally mounted runway section, pressure means engaging the upper edge of the sheet for maintaining the lower edge thereof in engagement with the grinding wheel including a pair of rotatable rollers arranged at opposite sides of the axis of rotation of the grinding wheel, and a separate mounting for each roller so that they are movable freely vertically independently of one another, said rollers being adjustable bodily horizontally relative to one another and with respect to the axis of rotation of said wheel.

WILLIAM J. ROBERTSON.